Nov. 19, 1968  S. M. SILVER  3,411,694
CARTONS FOR MOISTURE AND GAS BARRIER PACKAGING
Filed June 6, 1967  3 Sheets-Sheet 1
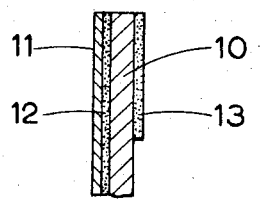
FIG.1.
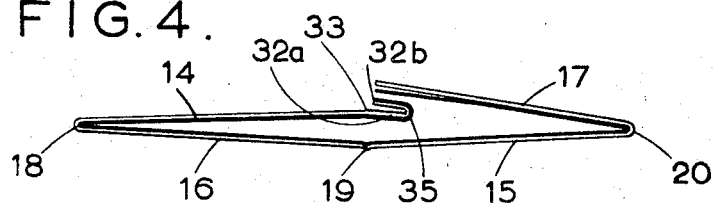
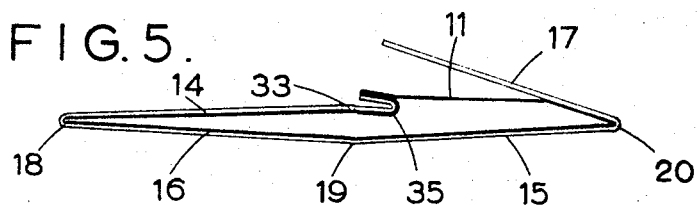
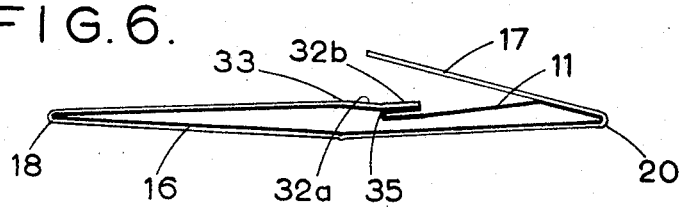
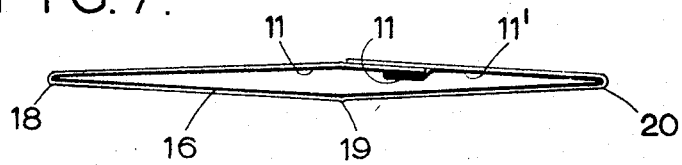

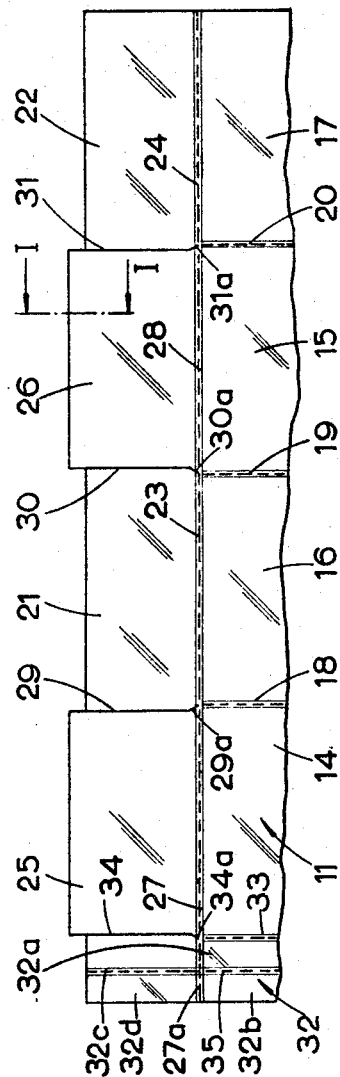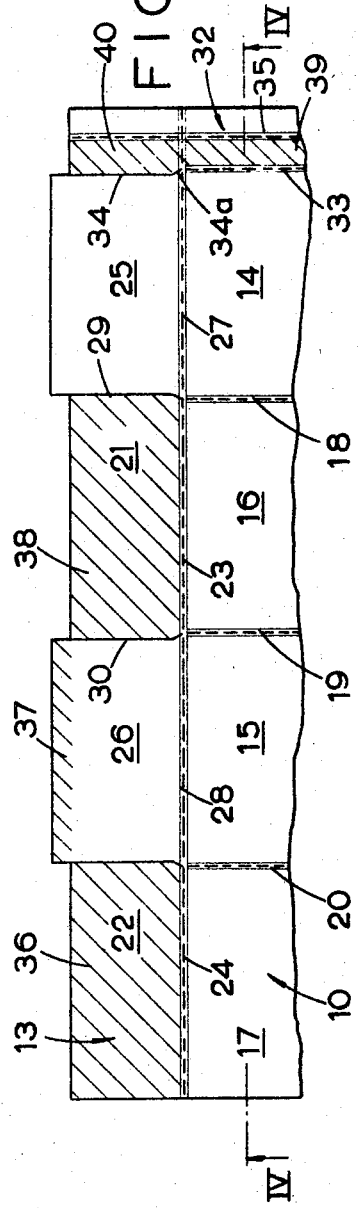

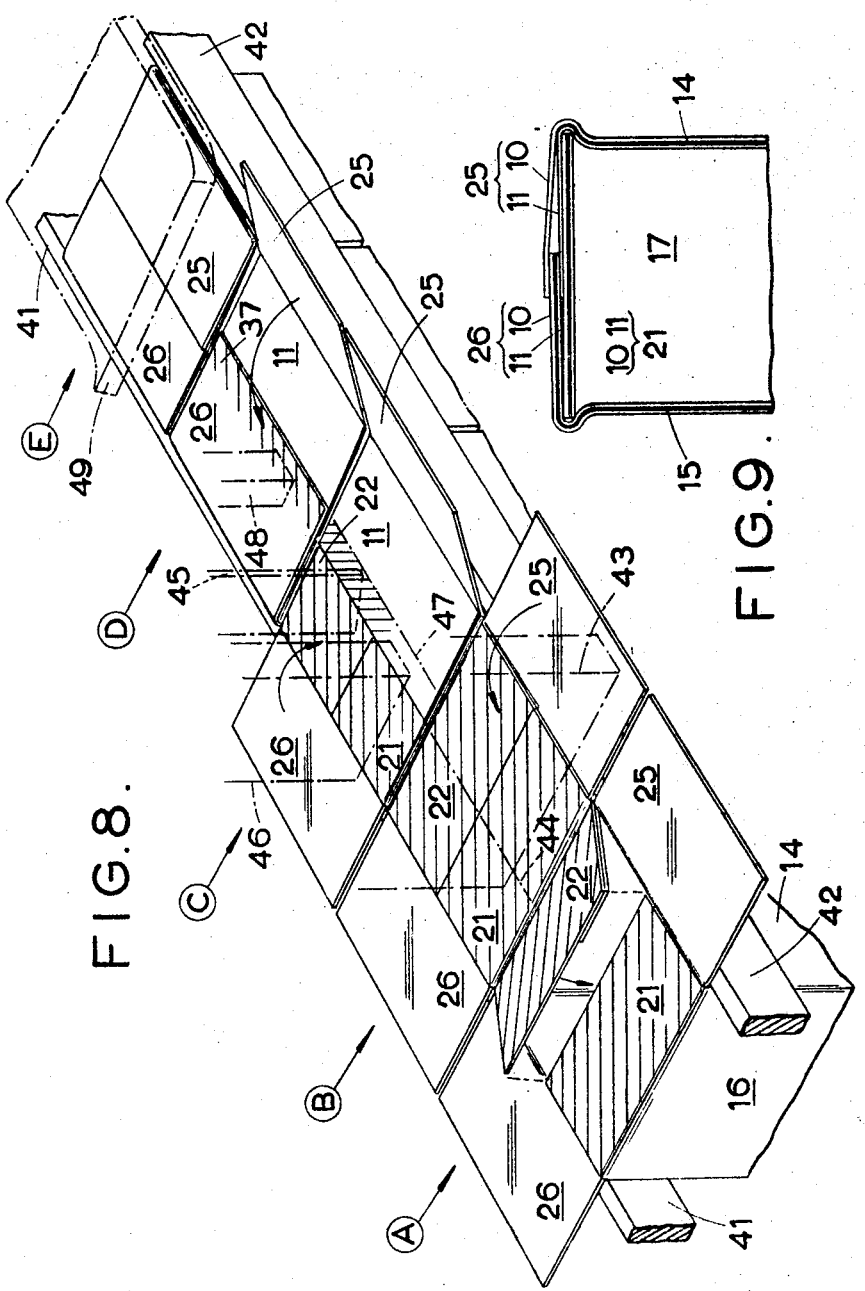

United States Patent Office 3,411,694
Patented Nov. 19, 1968

3,411,694
CARTONS FOR MOISTURE AND GAS
BARRIER PACKAGING
Stanley Milton Silver, 10 Blenhaim St.,
London W. 1, England
Filed June 6, 1967, Ser. No. 644,763
Claims priority, application Great Britain, June 7, 1966,
25,288/66
22 Claims. (Cl. 229—37)

ABSTRACT OF THE DISCLOSURE

This invention relates to blanks and cartons for moisture and gas barrier packaging, and to a method of securing a barrier membrane as a means of positively sealing the ends and side seams of a tubular carton.

---

Heretofore, the employment of a membrane to seal the open end of a carton has required the membrane to be applied through the use of intermittent motion equipment as the membranes were never integral with the package itself. Known methods have a disadvantage that the pinholes at the eight external corners of the package offered difficulty in adequate sealing. Further, the exposed raw edge of the glue flap forming the side seam presented certain difficulties, particularly with regard to the wicking of liquids into the exposed raw edge. Various methods for sealing this raw edge have been devised but these have usually involved the employment of additional materials and/or additional and critical manufacturing steps and/or ply thicknesses which would generally interfere with machine operation.

An object of the present invention therefore is to provide a material and a method which do not require such additional materials and which provide sealing of the raw glue flap edge positively. A further object is to provide a laminated material which will simplify the cutting and subsequent handling of the carton blank so that once the blank is cut and glued it is presented to the closing machinery as if it were composed of unitary sheet material.

According to the invention a blank or a carton is formed of a support layer of a substantially rigid material such as boxboard having on the whole of one surface thereof a barrier layer of a moisture-resistant flexible sheeting material secured overall to said support layer surface by an overall thermoplastic coating layer lying between the support layer and the barrier layer, said barrier layer being detached at at least an edge of the blank by local melting of the thermoplastic coating layer at a predetermined temperature, and said support layer having on at least selected areas of the other surface thereof contact with a thermoplastic adhesive coating. The adhesive coating is preferably activatable at a second temperature higher than said predetermined temperature. There may also be an adhesive coating on at least selected areas of the surface of the barrier layer.

In a blank for a parallelepipedal carton of such material, comprising two pairs of rectangular side panels to form pairs of opposite sides for the carton, each side panel is hingeably defined at a side thereof from at least one adjacent panel by a fold line, the panels of the first pair each having at each end thereof a dust flap hingeably defined therefrom by a fold line, the panels of the second pair each having at each end a cover flap hingeably defined therefrom by a fold line, and a glue flap extending from and hingeably defined by a fold line from one side of one of said panels, the dust flaps and cover flaps being defined from one another, and said selected areas comprising the four cover and dust flaps, the free margins of those cover flaps lying between the dust flaps, and at least part of the glue flap. Conveniently, the glue flap is formed with a median fold line extending parallel with the fold line defining it from said adjacent panel, said median fold line dividing the glue flap into a root portion and a free portion and being arranged to permit the free portion to hinge oppositely to the root portion.

According to another aspect of the invention, a method of erecting a carton from such a blank comprises the steps of folding the blank about its side panel fold lines to form a tubular structure with the barrier layer on the inside of said tubular structure, and securing the glue flap to the free margin of the panel at the opposite end of the blank; folding in the dust flaps at one end of the tubular structure; heat-releasing and stripping the barrier layer from one adjacent cover flap at said first temperature, and folding in the stripped portion to lie against and over the folded in dust flaps; and folding in the other flaps and securing them so as to close the carton.

According to a further aspect of the invention, a package is composed of a substantially rigid material such as boxboard to which a moisture-resistant flexible sheeting material has been adhered by means of a thermoplastic coating such as microcrystalline wax, a portion of the said sheeting material being, when processed, capable of being heat-loosened from a corresponding portion of the said rigid material and the loosenable sheeting material being adhered to at least one other portion of the sheeting material, after which the said loosenable sheeting material is stripped from its board support and all of the surfaces of the rigid material whose surfaces were stripped by this delamination never thereafter entirely directly overlie the portion of loosened sheeting which had originally been stripped from them.

The invention will be described by way of example with reference to the accompanying drawings, in which:

FIGURE 1 is a fragmentary cross-section, on the line I—I, FIGURE 2, of a piece of laminated board from which a carton blank is to be made, FIGURE 2 is a fragmentary elevation of the inside of a carton blank, FIGURE 3 is a fragmentary elevation of the outside of the carton blank of FIGURE 2, FIGURES 4 to 7 are diagrammatic representations of consecutive steps in the formation of a carton from the flat blank into the tubular form, FIGURE 8 is a diagrammatic perspective view of a series of so formed tubular structures passing through the various steps whereby one of the ends of such a tubular structure is closed, and FIGURE 9 is a fragmentary diagrammatic cross-section of the closed end of the carton.

Referring to FIGURE 1, a carton blank is formed of laminated material comprising a support layer of boxboard 10, having over the whole of one surface thereof a barrier layer 11 of a moisture-resistant flexible material such as polyethylene or aluminum foil secured overall to the support layer 10 by a thermoplastic coating layer of microcrystalline wax 12 lying between the support layer 10 and the barrier layer 11. The barrier layer 11 is capable of being detached locally by local melting of the thermoplastic coating layer 12 at a predetermined temperature. The support layer 10 of boxboard or the like is inherently sufficiently porous to absorb the melted film of micro-crystalline wax, so that upon cooling no re-adhesion will occur between it and the barrier layer 11. The support layer 10 has on selected areas thereof, on the side remote from the barrier layer 11, an adhesive coating 13 which may be applied in any desired pattern according to requirements. The adhesive coating 13 is activatable at a temperature higher than the predetermined temperature at which the coating layer 12 becomes melted to release local portions of the barrier layer 11.

One example of a suitable adhesive 13 is "hot melt" (a trade term) comprising a wax enriched with certain additives and constituting a very viscous, instant-drying material exhibiting maximum tackiness at a certain temperature. Another example is "Elvax" register trademark), a Du Pont product, also comprising a wax base with wax additives, less viscous and less sticky than hot melt.

FIGURES 2 and 3 illustrate a carton blank for a parallelepipedal carton. FIGURE 2 shows the inside surface of the blank, while FIGURE 3 shows the outside surface. In other words, relating these to FIGURE 1, FIGURE 2 shows the surface having exposed thereon the layer 11, while FIGURE 3 shows the boxboard support layer 10 with certain areas such as indicated at 13 covered with the adhesive layer and indicated where so covered by hatching.

The blank comprises two pairs of rectangular panels, a first pair 14, 15 and a second pair 16, 17, defined from one another by fold lines 18, 19, and 20. The panels 16 and 17 each have at each end a dust flap 21 or 22 defined from the side panel by a fold line 23 or 24. Only the flaps and panels at one end of the blank are specifically designated in FIGURES 2 and 3, but the other end of the blank may be regarded as identical but oppositely handed.

The panels 14 and 15 each have at each end a cover flap 25 or 26 defined from the side panel by a fold line 27 or 28. The cover flaps and dust flaps are defined from their neighbours by cut lines 29, 30, 31. It will be seen that these cut lines are not straight throughout their length, but at their ends adjacent to the side panels have angularly disposed portions 29a, 30a, and 31a, so that the cover flaps are slightly wider at their roots, while the dust flaps are slightly narrower, than their general width.

A glue flap 32 extends from the side panel 14 and is defined therefrom by a fold line 33 and from the cover flap 25 by a cut line 34 and an angularly disposed cut line extension 34a. The glue flap 32 has a median fold line 35 sub-dividing it into a root portion 32a and a free portion 32b, while the fold line 27 of the cover flap 25 is extended at 27a to define an extension glue flap having root and free portions 32c and 32d respectively.

The outside surface of the blank, as will be seen in FIGURE 3, is provided with a pattern of hot melt over selected areas indicated by hatching as hereinabove mentioned with respect to reference 13. These areas are self-explanatory, and are designated respectively 36, 37, 38, 39, and 40.

Referring now also to FIGURES 4 to 7, let us consider the formation of a tubular structure from the blank of FIGURES 1, 2, and 3. This is the first stage in the erection of a carton, the second stage being the closure of the ends of the carton. References employed in FIGURES 4 to 7 will be those on the line IV—IV, FIGURE 3, purely for convenience.

The blank is folded about the fold lines 20, 19, 18, 33, and 35 so that the free portion 32b is retroverted against the root portion 32a of the glue flap (see FIGURE 4). This brings face to face the areas of polyethylene 11 which lie over the free portion 32b of the glue flap and over the margin of the side panel 17. The confronting areas are then subjected to heat to effect heat sealing of the continuous polyethylene areas, and simultaneously locally melting the coating layer which hitherto retained the polyethylene layer 11 to the boxboard. When the assembly is released, the natural spring of the boxboard causes the side panel 17 to move away, as shown in FIGURE 5, partially stripping off therefrom the polyethylene layer 11, which remains heat-sealed or adhered to the free portion 32b of the glue flap.

If another barrier layer material such as aluminum foil were being employed, hot melt would have previously been applied during the folding process, and the confronting areas would then be subjected to heat, as with polyethylene, to activate the hot melt and produce local melting of the coating layer.

Referring now to FIGURE 6, the free portion 32b of the glue flap is folded about the median fold line 35 to re-assume its original position co-planar with the root portion 32a. This brings the entire glue flap into a position between the stripped portion of the side panel 17 and the polyethylene layer 11. The root portion 32a has, it will be remembered, an area 39 of hot melt on it (see FIGURE 3), and this is now heat activated and the glue flap is secured to the margin of the side panel 17, to achieve the condition illustrated in FIGURE 7.

This figure shows a tubular assembly in which the entire interior surface of the tube is covered by the polyethylene layer 11. There are no raw exposed edges of the glue flap. The barrier is continuous and complete.

Closing of one end of the carton is illustrated in FIGURE 8. The tubular structure so far described is folded to a rectangular cross-section and fed to guide bars 41, 42 by conventional means. Conditions obtaining at successive stations A, B, C, D, and E are illustrated.

At station A, the portions 32c and 32d are folded about the fold line 27a so as to lie against the dust flap 22, and the dust flaps 21, 22 are folded in so as to lie horizontally. If necessary, suitable support is provided by means (not shown) to prevent them from being folded further than the horizontal. The carton now moves to station B.

At station B, it will be seen that the visible surfaces of the dust flaps 21, 22 are coated with hot melt, while the visible surfaces of the cover flaps 25, 26 are covered with polyethylene.

A heater indicated in phantom at 43 is now passed, in the direction of travel of the carton along the guide bars, over the visible surface of the cover flap 25 and the adjacent area of the in-turned dust flaps 21, 22, as far as the median line 44 of the dust flaps which extends parallel with the guide bars. By this means, the hot melt is activated, and the polyethylene layer on the cover flap 25 is loosened. The cover flap 25 is then folded upwardly and inwardly, as indicated by the arrow, so as to overlie the dust flaps 21, 22.

Referring now to station C, due to the natural tendency of the boxboard flap 25 to spring back, it returns from its inwardly folded position to the altitude shown at station C, and in doing so strips off the polyethylene layer, which remains in the position indicated at 11. A heater, indicated in phantom at 46, is then passed over the adjacent area of the dust flaps 21, 22, as far as the median line 47, so activating the hot metal. A small scraper blade indicated in phantom at 45 then wipes molten hot melt over the edge of the polyethylene surface 11 which borders the dust flaps. The cover flap 26 is then turned in in the direction of the arrow.

Station D shows the cover flap 26 turned in and overlying the margin of the layer 11. This exposes the area 37 of hot melt at the margin of the cover flap 26. This is then activated by a heater shown in phantom at 48, and the boxboard layer of the cover flap 25 is then turned in as indicated by the arrow. The carton then moves to station E.

At station E the closed end of the carton is passed under a cool pressure plate indicated in phantom at 49, thus effecting adhesion of the boxboard of the closure flap 25 to the hot melt area 37 on the outside of the closure flap 26.

The closed end of the carton is shown diagrammatically in FIGURE 9. It will be seen that the layer 11 of polyethylene extends entirely around the interior of the carton, providing a complete barrier. The dust flap 26, as will be seen from FIGURE 3, has a width between the cut lines 29, 30 slightly greater than the width of the side panel 16. Conveniently the guide rails 41, 42 are arranged to pinch the side panels 14, 15, so providing closer contact with the dust flaps.

I claim:

1. A blank for a carton comprising a support layer of a substantially rigid material such as boxboard having on the whole of one surface thereof a barrier layer of a moisture-resistant flexible sheeting material secured overall to said support layer surface by an overall thermoplastic coating layer lying between the support layer and the barrier layer, said barrier layer being detachable at at least an edge of the blank by local melting of the thermoplastic coating layer at a predetermined temperature, and said support layer having on at least selected areas of the other surface thereof contact with a thermoplastic adhesive coating.

2. A blank as claimed in claim 1, wherein the adhesive coating is activatable at a second temperature higher than said predetermined temperature.

3. A blank as claimed in claim 1, wherein there is also an adhesive coating on at least selected areas of the surface of the barrier layer.

4. A blank as claimed in claim 1, wherein said blank comprises two pairs of rectangular side panels to form pairs of opposite sides for the carton, each side panel being hingeably defined at a side thereof from at least one adjacent panel by a fold line, the panels of the first pair each having at each end thereof a dust flap hingeably defined therefrom by a fold line, the panels of the second pair each having at each end a cover flap hingeably defined therefrom by a fold line, and a glue flap extending from and hingeably defined by a fold line from one side of one of said panels, the dust flaps and cover flaps being defined from one another, and wherein said selected areas comprise the four cover and dust flaps, the free margins of those cover flaps lying between the dust flaps, and at least part of the glue flap.

5. A blank as claimed in claim 4, wherein the glue flap is formed with a median fold line extending parallel with the fold line defining it from said adjacent panel, said median fold line dividing the glue flap into a root portion and a free portion and being arranged to permit the free portion to hinge oppositely to the root portion.

6. A method of erecting and sealing an end of a carton formed from a blank of laminated material as claimed in claim 4, which comprises the steps of folding the blank about its side panel fold lines to form a tubular structure with the barrier layer on the inside of said tubular structure, and securing the glue flap to the free margin of the panel at the opposite end of the blank; folding in the dust flaps at one end of the tubular structure; heat-releasing and stripping the barrier layer from one adjacent cover flap at said first temperature, and folding in the stripped portion to lie against and over the folded in dust flaps; and folding in the other flaps and securing them so as to close the carton.

7. A method of erecting a carton from a blank formed of laminated material as claimed in claim 6, wherein the folding in of the other flaps and securing them to close the carton comprises the steps of folding in the other adjacent cover flap to lie against and over the folded in dust flaps and part of the stripped portion; activating the adhesive coating on the folded in dust flaps at said second temperature, and securing said other cover flap thereto; folding in said one cover flap and activating the adhesive coating on the free margin of said other cover flap and securing said one cover flap thereto; and repeating the steps performed on the dust flaps and cover flaps at the other end of the tubular structure so as to close the carton.

8. A package composed of a substantially rigid material such as boxboard to which a moisture-resistant flexible sheeting material has been adhered by means of a thermoplastic coating such as microcrystalline wax, a portion of the said sheeting material being, when processed, capable of being heat-loosened from a corresponding portion of the said rigid material and the loosenable sheeting material being adhered to at least one other portion of the sheeting material, after which the said loosenable sheeting material is stripped from its board support and all of the surfaces of the rigid material whose surfaces were stripped by this delamination never thereafter entirely directly overlie the portion of loosened sheeting which had originally been stripped from them.

9. A blank or a carton as claimed in claim 1, wherein the barrier layer is formed of thermoplastic film.

10. A blank or a carton as claimed in claim 1, wherein the barrier layer is formed of aluminum foil.

11. A blank or a carton as claimed in claim 1, wherein the barrier layer is secured to the support layer by microcrystalline wax.

12. A blank as claimed in claim 2, wherein there is also an adhesive coating on selected areas of the surface of the barrier layer.

13. The blank of claim 12, wherein said selected areas include a selected one from the marginal edge portion of said glue flap and the marginal edge portion of the panel at the opposite end of said blank.

14. A blank or a carton formed of a support layer of a substantially rigid material such as boxboard having on the whole of one surface thereof a barrier layer of a moisture-resistant flexible sheeting material secured overall to said support layer surface by an overall thermoplastic coating layer lying between the support layer and the barrier layer, said barrier layer being detached at at least an edge of the blank by local melting of the thermoplastic coating layer at a predetermined temperature, and said support layer having on at least selected areas of the other surface thereof contact with an adhesive coating, said blank comprising a plurality of panels hingeably defined by fold lines, one of said panels having a glue flap hingeably extending therefrom, said glue flap being formed with a median fold line dividing the glue flap into a root portion and a free portion and being arranged to permit the free portion to hinge oppositely to the root portion.

15. A blank or a carton formed of a support layer of a substantially rigid material such as boxboard having on the whole of one surface thereof a barrier layer of a moisture-resistant flexible sheeting material secured overall to said support layer surface by an overall thermoplastic coating layer lying between the support layer and the barrier layer, said barrier layer being detached at at least an edge of the blank by local melting of the thermoplastic coating layer at a predetermined temperature, and said support layer having on at least selected areas of the other surface thereof contact with an adhesive coating and said support layer of said blank having a pressure-resistant portion, whereby adhesion may be effected between said portion of the blank and a portion of the delaminable barrier material transferable from another portion of the blank.

16. The method of claim 6, wherein the securing of said glue flap to said free margin of said panel at the opposite end of said blank, includes the steps of folding said glue flap on itself along a median line of said glue flaps with its barrier-layer-free surface portions facing, heat releasing and stripping the barrier layer from at least the marginal edge portion of said end panel, adhering the marginal edge portion of said stripped barrier layer portion to the barrier layer portion of said folded-over glue flap portion, unfolding said glue flap and securing the marginal edge portion of the support layer of said opposite end panel over said support layer of said glue flap.

17. A carton formed from a folded blank comprising pairs of opposed side-wall panels, the panels of one of said pair of panels each having a dust flap extension at each end thereof, the panels of another of said pairs of panels each having a cover flap extension at each end thereof, and a glue flap at an edge of a panel at one end of said blank underlying and secured to the marginal edge portion of the panel at the other end of said blank, each of said wall panels, each said dust flap, each said cover flap, and said glue flap having a moisture barrier layer associated with its inner surface and substantially coextensive therewith; said dust flaps at each end of said carton inwardly folded; the barrier layer of one of the adjacent of said cover flaps overlying said inwardly folded dust flap, the other of said adjacent cover flaps overlying said barrier layer of said one cover flap and said one cover flap overlying and secured to said other cover flap.

18. The carton of claim 17, wherein the marginal edge portion of said barrier layer of said opposite end panel is folded over on itself and secured under the barrier layer of the marginal edge portion of said glue flap and said marginal edge portion of said opposite end panel is secured over said glue flap.

19. The carton of claim 17, wherein the barrier layer portions associated with said glue flap, with the side-wall panels between said opposite end panel and said glue flap of said dust flaps and of said other cover flaps are adhesively secured thereto.

20. The carton of claim 17, wherein said barrier layer of said one cover flap overlying said dust flaps is secured to at least a portion of said dust flaps.

21. The blank of claim 1, wherein said thermoplastic coating layer comprises micro-crystalline wax.

22. The blank of claim 1, wherein said barrier layer is of a shape substantially identical with the shape of said support layer.

References Cited
UNITED STATES PATENTS

| | | |
|---|---|---|
| 1,041,504 | 10/1912 | Moore. |
| 2,353,178 | 7/1944 | Moore _____ 229—14 |
| 2,423,804 | 7/1947 | Waters. |
| 2,866,584 | 12/1958 | Long _____ 229—14 |
| 2,979,247 | 4/1961 | Pellaton et al. |
| 3,078,768 | 2/1963 | Kuchenbecker. |

DAVIS T. MOORHEAD, *Primary Examiner.*